United States Patent
Brunswig et al.

(10) Patent No.: US 8,612,927 B2
(45) Date of Patent: Dec. 17, 2013

(54) BULK ACCESS TO METADATA IN A SERVICE-ORIENTED BUSINESS FRAMEWORK

(75) Inventors: Frank Brunswig, Heidelberg (DE); Daniel Hutzel, Karlsruhe (DE); Steffen Tatzel, Nussloch (DE); Joachim Fitzer, Schriesheim (DE); Stefan Baeuerle, Rauenberg-Rotenberg (DE); Daniel Goldmann, Mannheim (DE); Jens Weiler, Weingarten (DE); Thomas Gauweiler, Speyer (DE); Dirk Giebel, Walldorf (DE); Udo Klein, Maximiliansau (DE); Heiko Steffen, Ruelzheim (DE); Jan Teichmann, Neustadt/Weinstrasse (DE)

(73) Assignee: SAP AG, Walldorf (DE)

( * ) Notice: Subject to any disclaimer, the term of this patent is extended or adjusted under 35 U.S.C. 154(b) by 212 days.

(21) Appl. No.: 13/176,672

(22) Filed: Jul. 5, 2011

(65) Prior Publication Data
US 2013/0014080 A1  Jan. 10, 2013

(51) Int. Cl.
*G06F 9/44* (2006.01)
(52) U.S. Cl.
USPC ........................................... 717/102; 717/100
(58) Field of Classification Search
USPC ......................................................... 717/102
See application file for complete search history.

(56) References Cited

U.S. PATENT DOCUMENTS

| | | | | |
|---|---|---|---|---|
| 7,426,523 B2* | 9/2008 | Schroeder et al. | ..................... | 1/1 |
| 7,860,968 B2* | 12/2010 | Bornhoevd et al. | ............ | 709/224 |
| 7,890,540 B2* | 2/2011 | Shaburov | ...................... | 707/802 |
| 8,024,425 B2* | 9/2011 | Stoyanova | ..................... | 709/218 |
| 8,056,091 B2* | 11/2011 | Brunswig et al. | ............. | 719/315 |
| 8,260,762 B2* | 9/2012 | Drabant et al. | ................ | 707/705 |
| 2007/0282879 A1* | 12/2007 | Degenkolb et al. | ........... | 707/101 |
| 2008/0109468 A1* | 5/2008 | Singh et al. | ..................... | 707/102 |
| 2010/0057504 A1* | 3/2010 | Baeuerle et al. | .................. | 705/7 |
| 2010/0057771 A1* | 3/2010 | Baeuerle et al. | .......... | 707/103 R |
| 2010/0088391 A1* | 4/2010 | Brunswig et al. | ............. | 709/217 |
| 2010/0250648 A1* | 9/2010 | Cao et al. | ....................... | 709/203 |
| 2010/0251129 A1* | 9/2010 | Beringer et al. | ............... | 715/738 |
| 2011/0161940 A1* | 6/2011 | Brunswig et al. | ............. | 717/139 |
| 2011/0161942 A1* | 6/2011 | Brunswig et al. | ............. | 717/143 |
| 2012/0023154 A1* | 1/2012 | Demant et al. | ................ | 709/203 |
| 2012/0047483 A1* | 2/2012 | Amit et al. | ..................... | 717/104 |
| 2012/0159446 A1* | 6/2012 | Jentsch et al. | ................ | 717/124 |

* cited by examiner

*Primary Examiner* — Don Wong
*Assistant Examiner* — Theodore Hebert
(74) *Attorney, Agent, or Firm* — Mintz, Levin, Cohn, Ferris, Glovsky and Popeo, P.C.

(57) ABSTRACT

A bulk service interface can be instantiated for each of at least one service provider providing a plurality of business objects using a stored definition of a plurality of metadata properties relating to generation of a user interface that incorporates content of a plurality of business objects. The bulk service interface can query the stored definition and access, in a bulk metadata access process, dynamic metadata required for instantiation of the plurality of business objects. If the stored definition has not previously been received, a default bulk services access process that queries an existing dynamic metadata access interface of each of the plurality of business objects can be initiated to retrieve the dynamic metadata from each of the plurality of business objects. An instance of the user interface can be generated using dynamic metadata accessed by the bulk service interface and/or the retrieved by the default bulk services access process.

20 Claims, 5 Drawing Sheets

BULK ACCESS TO METADATA IN A SERVICE-ORIENTED BUSINESS FRAMEWORK

TECHNICAL FIELD

The subject matter described herein relates to providing bulk access to metadata, for example metadata of one or more business objects in a service-oriented business framework.

BACKGROUND

Various organizations make use of enterprise resource planning (ERP) software architectures to provide an integrated, computer-based system for management of internal and external resources, such as for example tangible assets, financial resources, materials, customer relationships, and human resources. An ERP software architecture is an example of a service oriented business framework that can, in some examples, be designed to facilitate the flow of information between business functions inside the boundaries of the organization and to manage connections to outside service providers, stakeholders, and the like. Such architectures often include one or more centralized databases accessible by a core software platform that consolidates business operations, including but not limited to those provided by the core software platform and one or more third party vendors, into a uniform and organization-wide system environment. The core software platform can reside on a centralized server or alternatively be distributed across modular hardware and software units that provide "services" and communicate via one or more direct or networked connections, for example over a network such as the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

Business objects or other data objects in an object-oriented computer program, such as for example an ERP, can represent the entities in a business domain that the object-oriented computer program is designed to support. A business object can encapsulate all or at least some of the data and business behavior associated with the entity that it represents. In some applications, a business object can be modeled and implemented in a normalized manner to optimize service provisioning. Joined data of other business objects for use in a user interface, a form, an agent, a data analytic routine or module, or the like may be more efficiently accessed using one or more denormalized views. A service adaptation can provide a mapping facility to fill the gap between a provider layer, for example one or more repositories storing data and data objects, and a consumer layer that accesses the data and data objects.

Service adaptations can include frontend service adaptations that allow for the combination of fields from different business object nodes so that a resulting adapted business object node can be used for displaying required business data in a user interface. With frontend service adaptation, an adapted business object node can be configured to contain fields from different business object nodes along an association path. Such an arrangement can result in a large amount of metadata residing and being processed by a frontend server. In addition, during runtime, all data on an associated path is transferred to the frontend server. Moreover, many association paths may need to be evaluated on the frontend in order to access required business object fields. All of such requirements relating to frontend service adaptation can negatively affect performance, network data volume, memory consumption, and response time for the corresponding user interfaces. Alternative approaches, described in co-pending and co-owned U.S. patent application Ser. Nos. 12/246,247, 12/648,206, and 12/648,216, the disclosures of each of which are incorporated herein by reference in their entireties, can include shifting service adaptation to the backend to improve performance, network data volume, memory consumption, response times, and the like.

SUMMARY

In one aspect, determining, at a bulk metadata service, whether a stored definition of a plurality of metadata properties relating to generation of a user interface has previously been received from a service consumer of the user interface. The user interface incorporates content of a plurality of business objects. The definition further includes identities of a plurality of nodes of the plurality of business objects corresponding to the plurality of metadata properties. If the stored definition has previously been received, a bulk service interface is instantiated for each of at least one service provider providing the plurality of business objects. The bulk service interface queries the stored definition and accesses, in a bulk metadata access process, dynamic metadata required for instantiation of the plurality of business objects. If the stored definition has not previously been received, a default bulk services access process is initiated. The default bulk services access process queries an existing dynamic metadata access interface of each of the plurality of business objects to retrieve the dynamic metadata from each of the plurality of business objects. An instance of the user interface is generated using at least one of the dynamic metadata accessed by the bulk service interface and the dynamic metadata retrieved by the default bulk services access process.

In some variations one or more of the following features can optionally be included. A stored model of a use case specific service for access of static metadata can be accessed from a metadata repository. The stored model can map the use case specific service to an existing metadata infrastructure of a core software platform. The model can optionally include a description of the use case specific service in a bulk metadata access description language. The bulk metadata access description language can optionally be based at least in part on a Service Adaption Language (SADL) of a business service adaptation (BSA). The existing dynamic metadata access interface of the business object can optionally be characterized by nodes having fine metadata granularity. The service provider can optionally include at least one of a core software platform and an external service provider accessible via the core software platform. At least one of the determining, the instantiating, the initiating, and the generating can optionally be performed by a computing system that includes a programmable processor.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims. It should be noted that, while descriptions of specific implementations of the current subject matter discuss delivery of enterprise resource planning software and in some examples delivery of enterprise resource planning software to multiple organizations via a multi-tenant system, the current subject matter is applicable to other types of software and data services access as well. The scope of the subject matter claimed below is therefore not limited except by the actual language of the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

An ERP software architecture can typically function as an integration platform for one or more third party software components such that features, functions, etc. of the core software platform of the ERP software architecture and features, functions, etc. of the one or more third party software components are presented in a unified, user-customizable manner. One or more business objects can provide access to these various feature, functions, etc.

Figure 1:
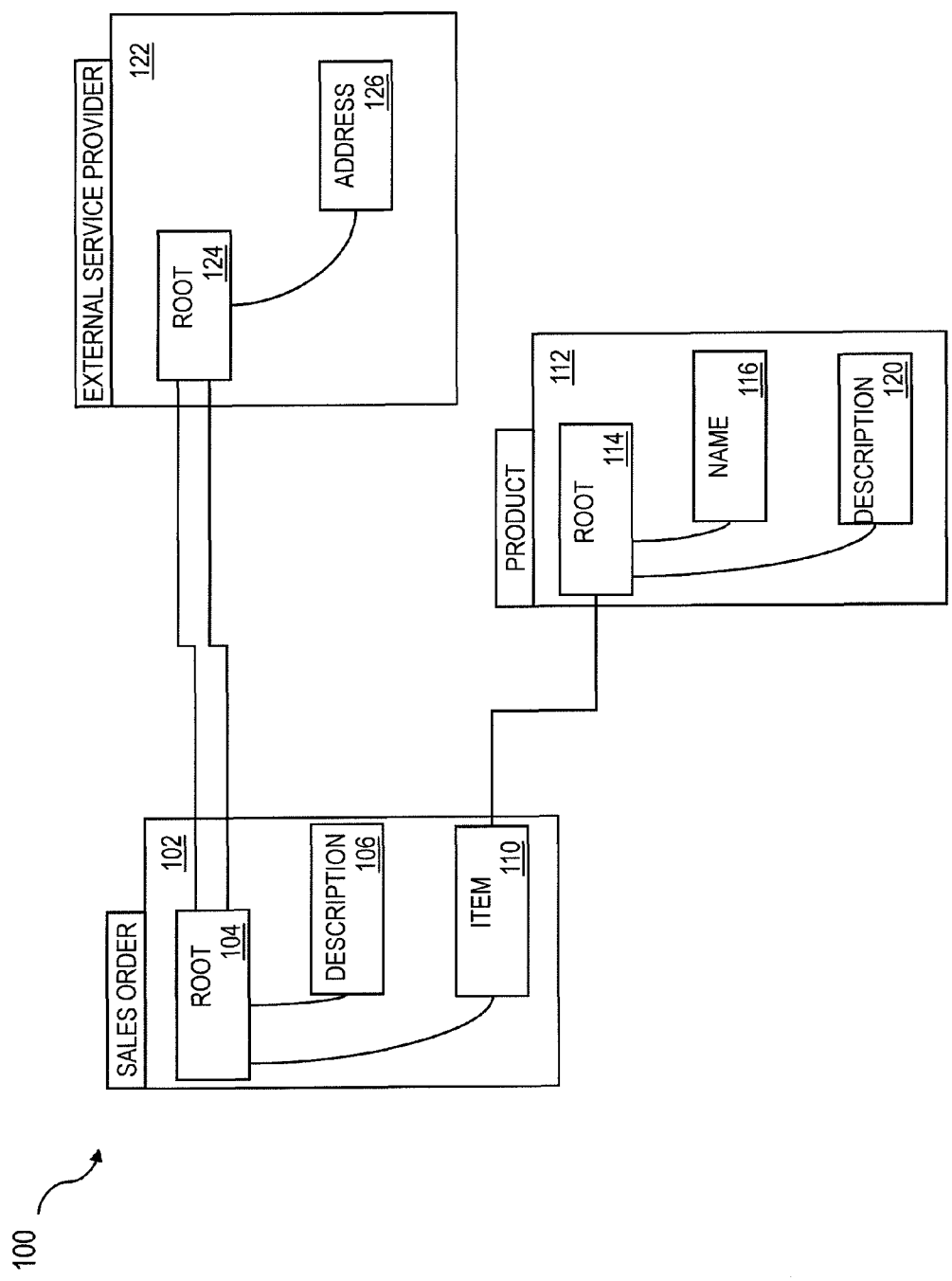
FIG. 1 is a block diagram showing calls between business objects in an example business process.

FIG. 1 shows a block diagram 100 illustrating an example of a business object query. A sales order business object 102 can include a root node 104 as well as a description node 106 describing attributes of the sales order. An item node 110 can link to a product business object 112 that includes a root node 114 as well as a name node 116 and a description node 120 that describes describing attributes of the product. The sales order business object 102 can also link to a external service provider business object 122 that includes its own root node 124 and an address node 126 describing attributes of a location of the external service provider (e.g. a business partner such as a supplier). During a sales order process implemented by an ERP system, a consumer runtime environment can access the sales order business object 102. The sales order business object 102 can in turn reference the external service provider business object 122 and the product business object 112, which may not be directly usable to the consumer runtime environment. For example, one or more of the business objects 102, 112, 122 can be normalized for other business processes. One or more of the business objects 102, 112, 122 can also be provided by a metadata repository of an external system that is not directly compatible with the consumer runtime environment. One or more service adaptations can facilitate more efficient access to the data of the business objects 102, 112, 122.

Business objects can include both dynamic metadata, which can generally be used by all kinds of user interfaces to facilitate the creation or modification of business object data, and static metadata, which are generally used to define data structures (e.g. tables, objects, etc.). A user interface, as noted above, may include more than one business object node, which can be included in either a single business object tasked with creation of the user interface or in one or more other business objects. Such one or more other business objects can be internal or external t the core software platform. The nodes required for display of the user interface can be joined such that the related data can be displayed in the user interface.

Under currently available approaches, access to dynamic metadata of a business object at runtime is generally limited by the granularity of a business object node. In other words, the smallest unit of dynamic metadata available for access from a business object is limited by how finely the metadata of the business subject are divided among the nodes of the business object. Accordingly, multiple requests to a business object may be required in generating a user interface based on the business object, and in some cases, the multiple requests can include redundant requests. For example, if a single business object node is used in a service adaption more than one time, the business object containing that node may need to be called repeatedly.

Using currently available approaches access to static metadata available in the metadata repository can be supported via one or more regular meta-objects via one or more consumer proxies, such as for example a local client proxy (LCP), an Advanced Business Application Programming (ABAP) consumer proxy (ACP), and a business service adaptation (BSA), and via/or a metadata application programming interface (API) which can be based on a runtime repository. Both APIs can be generic, for example not use case specific and both can have fine granularity. The metadata API can have very fine granularity, which can lead to many ABAP object instances and ABAP method calls to access the metadata necessary to generate a user interface based on the business object.

To address these and potentially other issues with currently available solutions, one or more implementations of the current subject matter provide methods, systems, articles or manufacture, and the like that can, among other possible advantages, provide a bulk metadata service that enables, among other possible functions, specification of requested dynamic metadata for a business object. A consumer of the bulk service can describe the requested properties and the nodes for which the properties are requested. The bulk service can be related to standard properties such as "read-only" or "disabled" and can also include one or more dynamic default values for an object create scenario. A service provider associated with the business object can instantiate one or more bulk service interfaces. If such instantiation is not available, a bulk services default module can orchestrate generation of a bulk services blueprint by calling a dynamic metadata access interface of a business object that has been pre-prepared at design time with business object node dependencies and other inter-connections defined at a fine granularity.

A metadata repository can also include models for use-case specific services for access of static metadata. Such services can be mapped to the already existing metadata infrastructure via a repository manager. A bulk metadata access description language can be used to describe use-case specifics. In some implementations, the bulk metadata access description language can be based on the Service Adaption Language (SADL) of the Business Service Adaptation (BSA), both of which are available from SAP AG of Walldorf, Germany. The runtime access can in some implementations be based on generated ABAP classes for consumer convenience. Runtime access ABAP classes can also be implemented to use internal shortcuts of a metadata repository infrastructure to further improve access performance.

Figure 2:
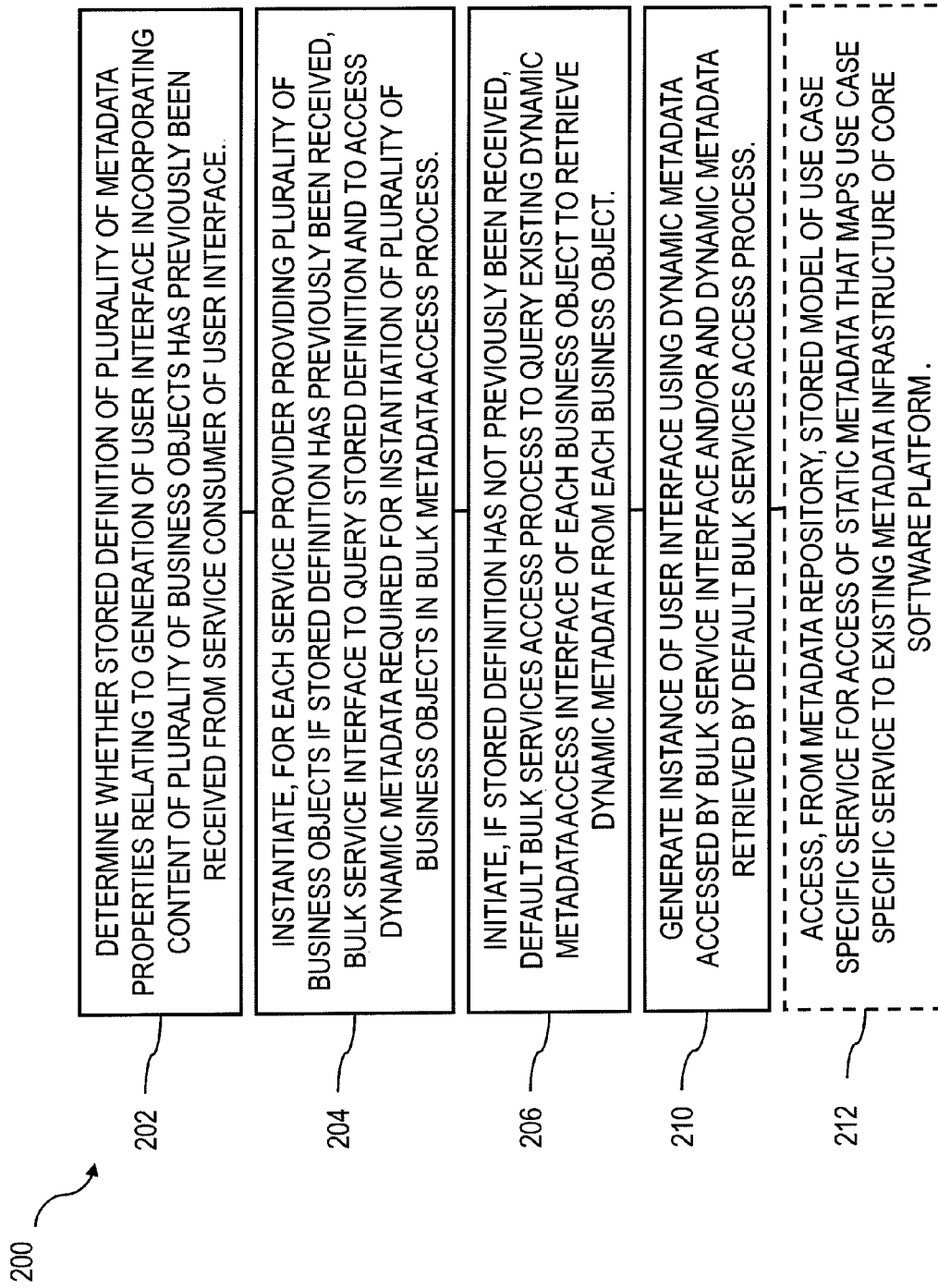
FIG. 2 is a process flow diagram illustrating aspects of a method having one or more features consistent with implementations of the current subject matter.

FIG. 2 shows a process flow chart 200 illustrating a method having features consistent with one or more implementations of the current subject matter. At 202, a determination is made whether a stored definition of a plurality of metadata properties relating to generation of a user interface has previously been received from a service consumer of the user interface that incorporates content of a plurality of business objects. The definition can include identities of a plurality of nodes of the plurality of business objects corresponding to the plurality of metadata properties. The determination can be made at a bulk metadata service. If the stored definition has previously been received, at 204 a bulk service interface for each of at least one service provider (e.g. one or more of a core software platform, an external service provider accessible via the core software platform, and the like) providing the plurality of business objects is instantiated. The bulk service interface queries the stored definition and accesses dynamic metadata required for instantiation of the plurality of business objects in a bulk metadata access process. If the stored definition has not previously been received, a default bulk services access process is initiated at 206. The default bulk services access process queries an existing dynamic metadata access interface of each of the plurality of business objects to retrieve the dynamic metadata from each of the plurality of business objects. An existing dynamic metadata access interface of the business object can, in some implementations, be characterized by nodes having fine metadata granularity. At 210, an instance of the user interface is generated using at least one of the dynamic metadata accessed by the bulk service interface and the dynamic metadata retrieved by the default bulk services access process. As used herein, the term "fine granularity" refers to metadata being retrievable only on the node level. In such a situation, metadata can be read node by node but not for a set of nodes all at once.

Optionally, at 212, a stored model of a use case specific service for access of static metadata can be accessed from a metadata repository. The stored model, which can in some implementations include a description of the use case specific service in a bulk metadata access description language (e.g. one based at least in part on the Service Adaption Language (SADL) of the business service adaptation (BSA) available from SAP AG of Walldorf, Germany) can map the use case specific service to an existing metadata infrastructure of the core software platform.

Figure 3:
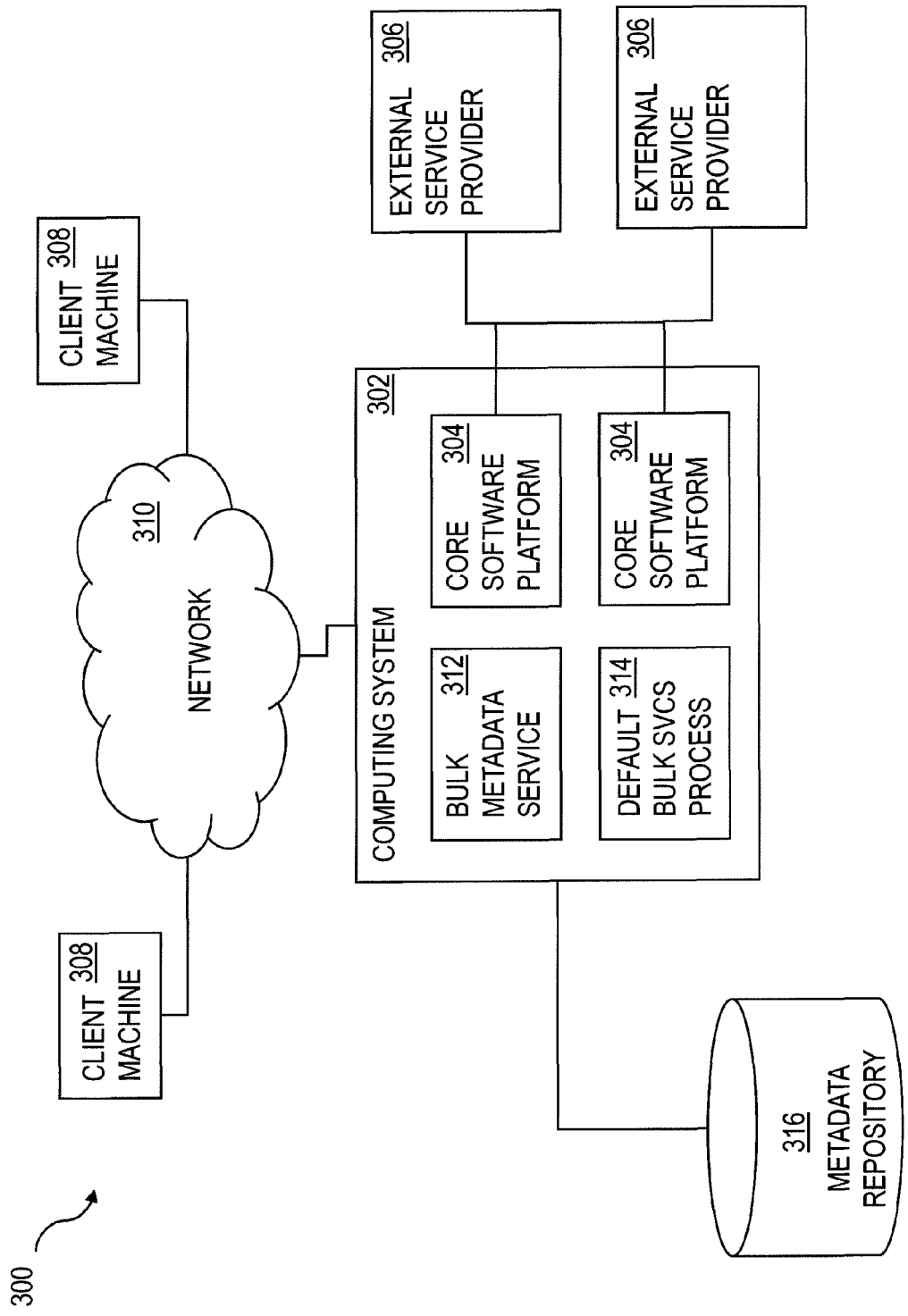
FIG. 3 is a diagram illustrating aspects of a system showing features consistent with implementations of the current subject matter.

FIG. 3 shows an example of a system 300 consistent with the current subject matter. A computing system 302 that can include one or more programmable processors, which can be collocated, linked over one or more networks, etc., can execute one or more core software platform modules 304 that provide one or more ERP or other software application functions of the core software platform module(s) 304 and optionally of one or more external service provider software modules 306 such that the software application functions are accessible to local users as well as remote users accessing the computing system 302 from one or more client machines 308 via a network 310. One or more user interface screens produced by the one or more core software platform modules 304 can be displayed to a user, either via a local display or via a display associated with one of the client machines 308. A bulk metadata service module 312 can be implemented as shown in FIG. 3 on the same computing system 302 as the one or more core software platform modules 304 or, alternatively, on another computing system external to the computing system 302. The bulk metadata service module 312 can perform one or more of the bulk service interface functions described above as well as optional additional functions. A default bulk services access process module 314 can also be implemented as shown in FIG. 3 on the same computing system 302 as the one or more core software platform modules 304 or, alternatively, on another computing system external to the computing system 302, and can perform one or more of the default bulk services access process functions described above as well as optional additional functions. A metadata repository 316 can be accessible to or, alternatively, included as part of the computing system 302, and can store models of use case specific service for access of static metadata, for example as described above.

One or more core software platform modules 304 of an ERP software architecture can be provided as part of a standalone, customized software installation that runs on one or more processors that are under the control of an organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement. In a SaaS arrangement, the ERP system architecture (e.g. the core software platform) can be hosted on computing hardware such as servers and data repositories that are maintained remotely from the organization's location and accessed by authorized users at the organization via a thin client, such as for example a web browser, over a network.

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 4:
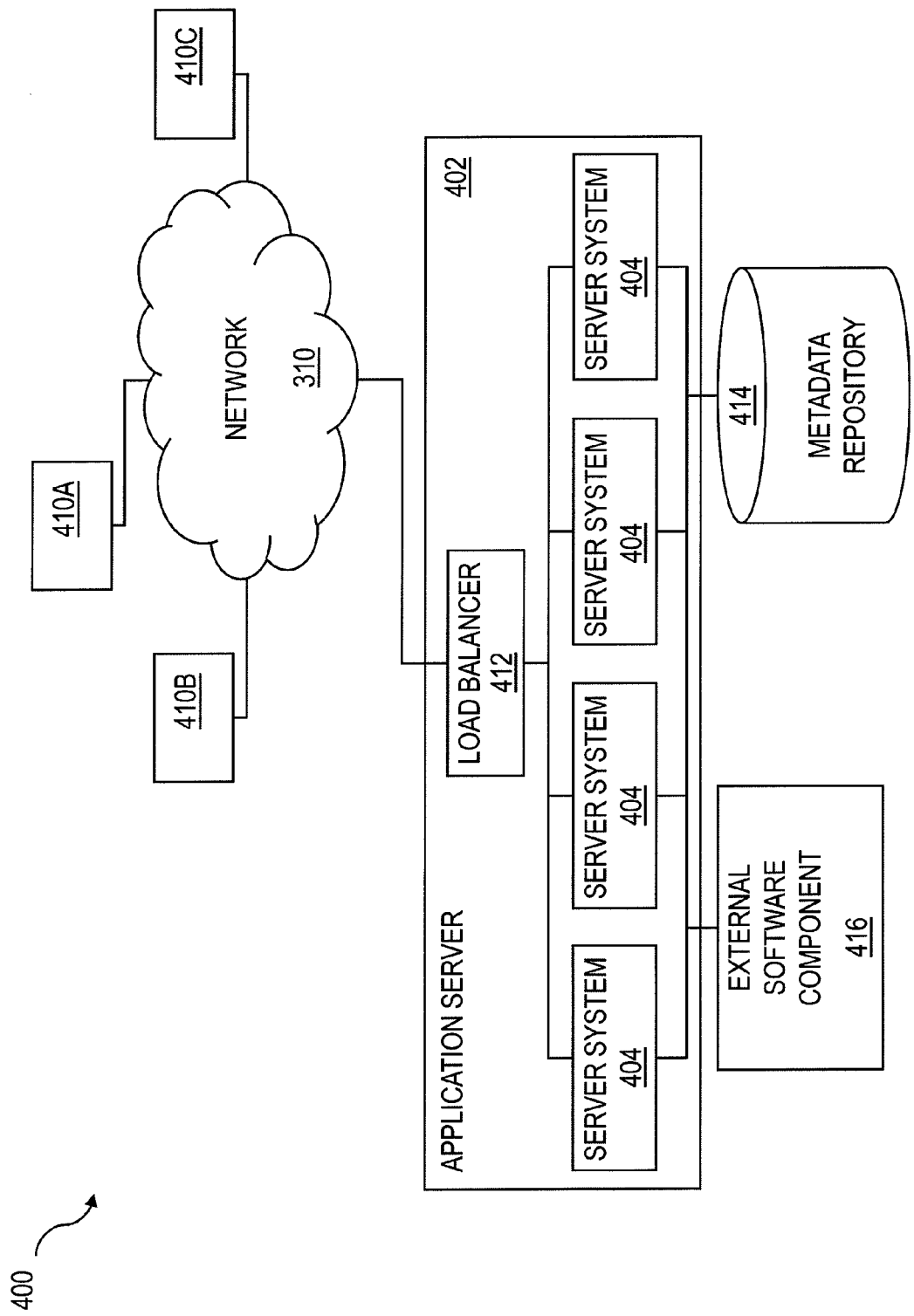
FIG. 4 is a diagram showing an example of a multi-tenant approach to providing customized software services to multiple organizations from a single architecture.

FIG. 4 shows a block diagram of a multi-tenant implementation of a software delivery architecture 400 that includes an application server 402, which can in some implementations include multiple server systems 404 that are accessible over a network 310 from client machines operated by users at each of multiple organizations 410A-410C (referred to herein as "tenants" of a multi-tenant system) supported by a single software delivery architecture 400. For a system in which the application server 402 includes multiple server systems 404, the application server can include a load balancer 412 to distribute requests and actions from users at the one or more organizations 410A-410C to the one or more server systems 404. A user can access the software delivery architecture across the network using a thin client, such as for example a web browser or the like, or other portal software running on a client machine. The application server 402 can access data and data objects stored in one or more data repositories 414. The application server 402 can also serve as a middleware component via which access is provided to one or more external software components 416 that can be provided by third party developers.

Figure 5:
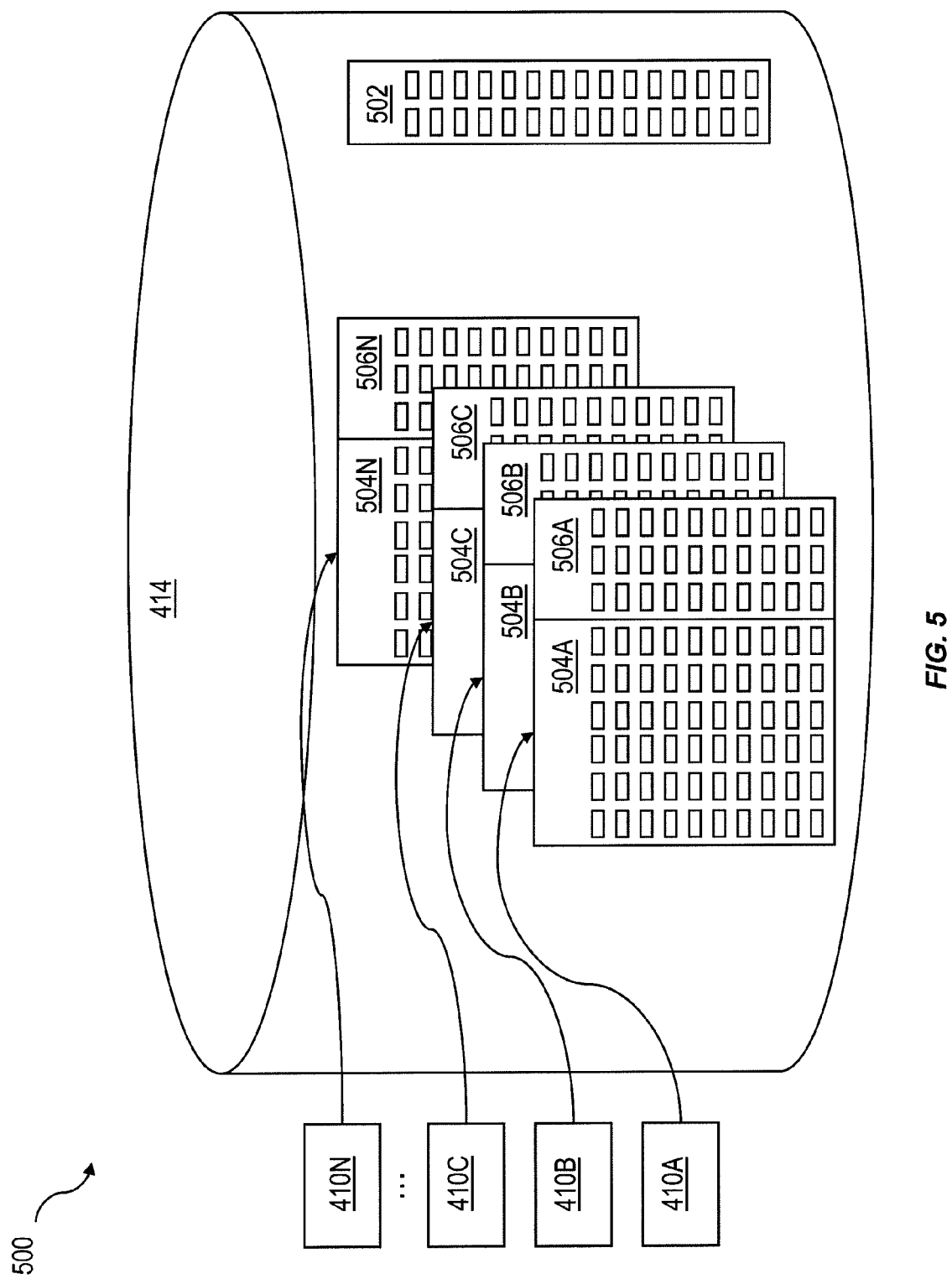
FIG. 5 is a diagram showing storage of both core software package data objects and tenant-specific data objects for each of multiple tenants of a multi-tenant system.

To provide for customization of the core software platform for each of multiple organizations supported by a single software delivery architecture 400, the data and data objects stored in the repository or repositories 414 that are accessed by the application server 402 can include three (or optionally more) types of content as shown in FIG. 5: core software platform content 502, system content 504, and tenant content 506. Core software platform content 502 includes content that represents core functionality and is not modifiable by a tenant. System content 504 can in some examples be created by the runtime of the core software platform and can include core data objects that are modifiable with data provided by each tenant. For example, if the core software platform is an ERP system that includes inventory tracking functionality, the system content 504A-504N can include data objects for labeling and quantifying inventory. The data retained in these data objects are tenant-specific: for example, each tenant 410A-410N stores information about its own inventory. Tenant content 506A-506N includes data objects or extensions to other data objects that are customized for one specific tenant 410A-410N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 506 can include condition records in generated condition tables, access sequences, price calculation results, or any other tenant-specific values. A combination of the software platform content 502 and system content 504 and tenant content 506 of a specific tenant are presented to users from that tenant such that each tenant is provided access to a customized solution whose data are available only to users from that tenant.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 402 that includes multiple server systems 404 that handle processing loads distributed by a load balancer 412. Potential benefits from such an arrangement can include, but are not limited to, high and reliably continuous application server availability and minimization of unplanned downtime, phased updating of the multiple server systems 404 to permit continuous availability (one server system 404 can be taken offline while the other systems continue to provide services via the load balancer 412), scalability via addition or removal of a server system 404 that is accessed via the load balancer 412, and de-coupled lifecycle processes (such as for example system maintenance, software upgrades, etc.) that enable updating of the core software independently of tenant-specific customizations implemented by individual tenants.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A non-transitory computer program product storing instructions that, when executed by at least one programmable processor, cause the at least one programmable processor to perform operations comprising:
   determining, at a bulk metadata service, whether a stored definition of a plurality of metadata properties relating to generation of a user interface has previously been received from a service consumer of the user interface, the user interface incorporating content of a plurality of business objects, the definition further comprising identities of a plurality of nodes of the plurality of business objects corresponding to the plurality of metadata properties;
   instantiating, if the stored definition has previously been received, a bulk service interface for each of at least one service provider providing the plurality of business objects, the bulk service interface querying the stored definition and accessing, in a bulk metadata access process, dynamic metadata required for instantiation of the plurality of business objects;
   initiating a default bulk services access process if the stored definition has not previously been received, the default bulk services access process querying an existing dynamic metadata access interface of each of the plurality of business objects to retrieve the dynamic metadata from each of the plurality of business objects; and
   generating an instance of the user interface using at least one of the dynamic metadata accessed by the bulk service interface and the dynamic metadata retrieved by the default bulk services access process.

2. A computer program product as in claim 1, wherein the operations further comprise accessing, from a metadata repository, a stored model of a use case specific service for access of static metadata, the stored model mapping the use case specific service to an existing metadata infrastructure of a core software platform.

3. A computer program product as in claim 2, wherein the model comprises a description of the use case specific service in a bulk metadata access description language.

4. A computer program product as in claim 3, wherein the bulk metadata access description language is based at least in part on a Service Adaption Language (SADL) of a business service adaptation (BSA).

5. A computer program product as in claim 1, wherein the existing dynamic metadata access interface of the business object is characterized by nodes having fine metadata granularity.

6. A computer program product as in claim 1, wherein the service provider comprises at least one of a core software platform and an external service provider accessible via the core software platform.

7. A computer-implemented method comprising:
   determining, at a bulk metadata service, whether a stored definition of a plurality of metadata properties relating to generation of a user interface has previously been received from a service consumer of the user interface, the user interface incorporating content of a plurality of business objects, the definition further comprising identities of a plurality of nodes of the plurality of business objects corresponding to the plurality of metadata properties;
   instantiating, if the stored definition has previously been received, a bulk service interface for each of at least one service provider providing the plurality of business objects, the bulk service interface querying the stored definition and accessing, in a bulk metadata access process, dynamic metadata required for instantiation of the plurality of business objects;
   initiating a default bulk services access process if the stored definition has not previously been received, the default bulk services access process querying an existing dynamic metadata access interface of each of the plurality of business objects to retrieve the dynamic metadata from each of the plurality of business objects; and
   generating an instance of the user interface using at least one of the dynamic metadata accessed by the bulk service interface and the dynamic metadata retrieved by the default bulk services access process.

8. A computer-implemented method as in claim 7, further comprising accessing, from a metadata repository, a stored model of a use case specific service for access of static metadata, the stored model mapping the use case specific service to an existing metadata infrastructure of a core software platform.

9. A computer-implemented method as in claim 8, wherein the model comprises a description of the use case specific service in a bulk metadata access description language.

10. A computer-implemented method as in claim 9, wherein the bulk metadata access description language is based at least in part on a Service Adaption Language (SADL) of a business service adaptation (BSA).

11. A computer-implemented method as in claim 7, wherein the existing dynamic metadata access interface of the business object is characterized by nodes having fine metadata granularity.

12. A computer-implemented method as in claim 7, wherein the service provider comprises at least one of a core software platform and an external service provider accessible via the core software platform.

13. A computer-implemented method as in claim 7, wherein at least one of the determining, the instantiating, the initiating, and the generating are performed by a computing system comprising a programmable processor.

14. A system comprising:
   at least one programmable processor; and
   at least one machine-readable medium storing instructions that, when executed by the at least one programmable processor, cause the at least one programmable processor to perform operations comprising:
      determining, at a bulk metadata service, whether a stored definition of a plurality of metadata properties relating to generation of a user interface has previously been received from a service consumer of the user interface, the user interface incorporating content of a plurality of business objects, the definition further comprising identities of a plurality of nodes of the plurality of business objects corresponding to the plurality of metadata properties;

instantiating, if the stored definition has previously been received, a bulk service interface for each of at least one service provider providing the plurality of business objects, the bulk service interface querying the stored definition and accessing, in a bulk metadata access process, dynamic metadata required for instantiation of the plurality of business objects;

initiating a default bulk services access process if the stored definition has not previously been received, the default bulk services access process querying an existing dynamic metadata access interface of each of the plurality of business objects to retrieve the dynamic metadata from each of the plurality of business objects; and generating an instance of the user interface using at least one of the dynamic metadata accessed by the bulk service interface and the dynamic metadata retrieved by the default bulk services access process.

15. A system as in claim 14, wherein the operations further comprise accessing, from a metadata repository, a stored model of a use case specific service for access of static metadata, the stored model mapping the use case specific service to an existing metadata infrastructure of a core software platform.

16. A system as in claim 15, wherein the model comprises a description of the use case specific service in a bulk metadata access description language.

17. A system as in claim 16, wherein the bulk metadata access description language is based at least in part on a Service Adaption Language (SADL) of a business service adaptation (BSA).

18. A system as in claim 14, wherein the existing dynamic metadata access interface of the business object is characterized by nodes having fine metadata granularity.

19. A system as in claim 14, wherein the service provider comprises at least one of a core software platform and an external service provider accessible via the core software platform.

20. A system as in claim 19, wherein the core software platform provides multi-tenancy segregating data from each of a plurality of different organizations.

* * * * *